United States Patent

Miyakawa

[11] Patent Number: 4,577,875
[45] Date of Patent: Mar. 25, 1986

[54] EXCHANGE CHUCK FOR A TOOL

[75] Inventor: Eiji Miyakawa, Tokyo, Japan

[73] Assignee: Miyakawa Industry Co., Ltd., Seki, Japan

[21] Appl. No.: 437,615

[22] Filed: Oct. 29, 1982

[51] Int. Cl.⁴ ............................................. B23B 31/22
[52] U.S. Cl. ..................................... 279/75; 279/1 B;
408/239 A
[58] Field of Search .................. 279/75, 1 B, 1 A, 22,
279/30, 33; 408/239 A; 403/322, 326; 285/277,
316

[56] References Cited

U.S. PATENT DOCUMENTS

| | | | |
|---|---|---|---|
| 1,119,276 | 12/1914 | Wendland | 279/30 |
| 1,871,720 | 8/1932 | Meunier | 279/75 |
| 2,279,146 | 4/1942 | Schneller | 285/277 |
| 2,714,026 | 7/1955 | Schultz | 279/1 A |
| 3,652,009 | 3/1972 | Bilz | 279/75 |
| 3,788,658 | 1/1974 | Benjamin et al. | 279/75 |
| 3,897,089 | 7/1975 | Leichsenring | 285/316 |
| 4,006,996 | 2/1977 | Kasabian | 279/1 B |
| 4,444,223 | 3/1984 | Maldavs | 285/316 |

FOREIGN PATENT DOCUMENTS 0961825 6/1964 United Kingdom .

Primary Examiner—Gil Weidenfeld
Assistant Examiner—Thomas M. Kline
Attorney, Agent, or Firm—Leydig, Voit & Mayer, Ltd.

[57] ABSTRACT

An exchange chuck for exchangeably mounting a tool shank adapted for mounting a tool such as drill or tap. The tool shank is inserted to and fastened in a mounting bore formed in a tubular portion of a spindle. A movable sleeve is received on the tubular portion for movement longitudinally thereof, and plural balls are provided to the tubular portion so as to be intruded into or receded from said bore with movement of the movable sleeve, said balls operating to engage with and prevent extraction of the tool shank when intruded into the bore. An ejector member is received in the bottom region of the bore and biased forwardly at all times by a coil spring for extruding the tool shank forwardly at the time of exchange operation of the tool shank. The forward outer periphery of the ejector member is formed with an undercut annular groove contiguous to an engagement step operating to engage with the radially inner surfaces of the balls to prevent accidental extraction of the ejector member in the forward direction.

9 Claims, 6 Drawing Figures

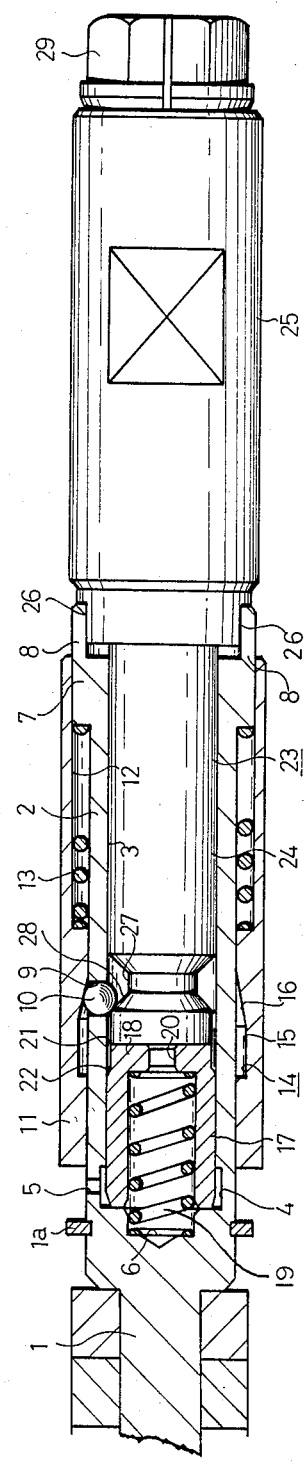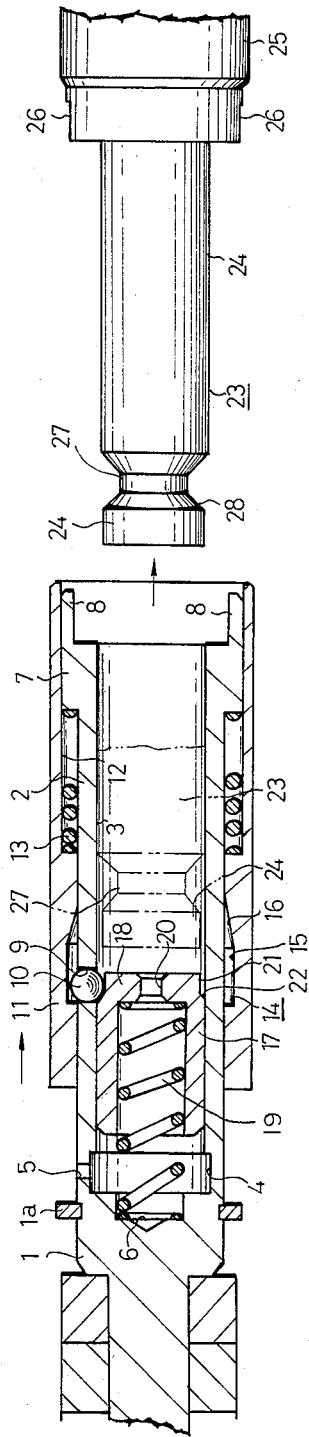
FIG.1
FIG.4

EXCHANGE CHUCK FOR A TOOL

FIELD OF THE INVENTION

This invention relates to an exchange chuck for a tool such as drill used for mounting or dismounting a tool such as drill or tap relative to a spindle.

OBJECTS OF THE INVENTION

It is an object of the present invention to provide an exchange chuck for a tool such as drill or tap by means of which the drill or tap may be mounted and dismounted relative to a spindle by a one-touch manual operation along with a tool shank.

It is another object of the present invention to provide an exchange chuck for a tool such as drill or chuck by means of which an ejector member operative to extrude a tool shank forwardly at the time of exchange operation of the tool shank may be halted in its forward movement without the necessity of providing special regulating devices.

It is a further object of the present invention to provide an exchange chuck for a tool such as drill by means of which the ejector member may be moved smoothly within the tubular portion of the spindle.

Other objects of the present invention will become apparent from the following description of the preferred embodiments and pointed out in the claims. Many advantages not mentioned in the specification will be apparent to those skilled in the art when practicing the invention.

BRIEF DESCRIPTION OF THE DRAWINGS

FIG. 1 is a sectional view showing an exchange chuck of the present invention with an exchange shaft annexed thereto.

FIG. 4 is a sectional view showing the exchange chuck with the exchange shaft being removed.

DESCRIPTION OF THE PREFERRED EMBODIMENTS

Figure 2:
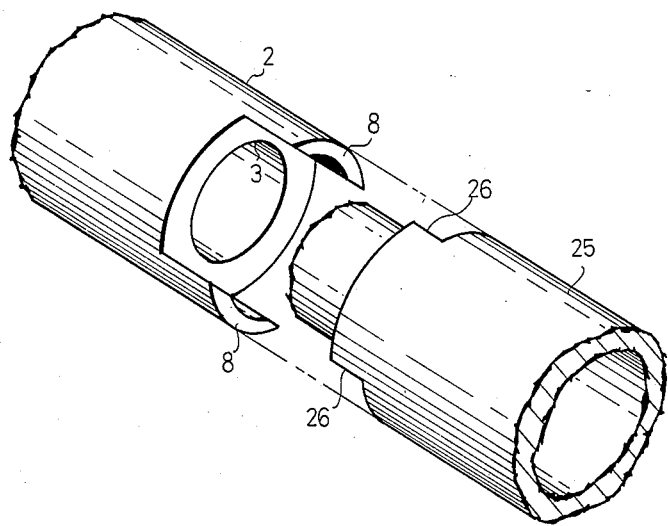
FIG. 2 is a partial perspective view showing the state of engagement between the tool shank and the tubular portion of the exchange chuck.
Figure 3:
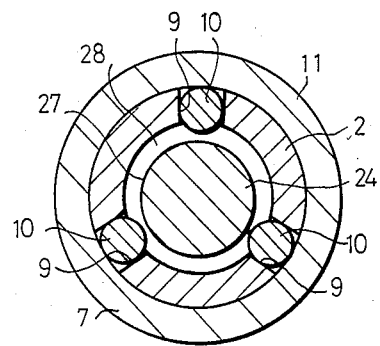
FIG. 3 is a transverse sectional view of the exchange chuck through the balls.

Referring to a preferred embodiment shown in FIGS. 1 through 4, there is shown a spindle 1 having a tubular portion 2 having a hollow inner mounting bore 3. A shank portion 24 of a tool shank 23 is introduced into and secured to this mounting bore 3. The inner end periphery of the bore 3 is formed with a relief groove 4 communicating with an air port 5 opening in the outer periphery of the tubular portion 2. The inner bottom surface of the bore is formed with a spring retaining slot 6 having a lesser diameter than the bore diameter.

The foremost part of the tubular portion 2 or the right-hand part thereof in FIG. 1 is formed with an enlarged diameter portion 7 and the foremost end face of the portion 2 has a pair of rotation inhibit projections 8. Plural through-holes 9 are formed through the wall of the tubular portion 2 at the center longitudinally of the portion 2 and balls 10 are accommodated in respective ones of these through-holes 9 so as to be movable towards the inside or outside of the tubular portion 2.

A sleeve 11 is mounted on the tubular portion 2 for sliding longitudinally thereof and an annular recess 12 is defined on the inner periphery of the foremost portion of the sleeve 11. The enlarged diameter portion 7 at the foremost part of the tubular portion 2 is received into this recess 12. A coil spring 13 is mounted between the inner end of the recess 12 and the enlarged diameter portion 7 of the tubular portion 2 for perpetually biasing the sleeve 11 towards rear or left-hand side when viewed in FIG. 1.

An undercut annular groove 14 is formed on the rear inner periphery of the movable sleeve 11 at a position corresponding to the balls 10 on the tubular portion 2. The groove 14 consists of a straight portion 15 into which the balls 10 may be intruded towards rear out of the mounting bore 3 in the tubular portion 2, and an inclined portion 16 forwardly contiguous to said straight portion 15 and through which the balls 10 may be extruded into the mounting bore 3. The inclined portion 16 has a diameter reduced progressively towards the front or towards right in FIG. 1.

Thus, in the state shown in FIG. 1, the balls 3 have radially inner surfaces, with respect to the longitudinal axis of the bore 3, which are biased into the bore 3 by operation of the inclined portion 16 of the annular groove 14. When the sleeve 11 is slid forwardly against resiliency of the coil spring 13 as shown in FIG. 4, the straight portion 15 of the groove 14 registers with balls 10, so that the balls 10 are receded out of the bore 3. The balls 10 are of a size such that the balls 10 may be receded completely out of the mounting bore 3. However, unless pressed obliquely from the inside of the bore 3, the radially inner surfaces of the balls 10 will remain in a position partially projected into the bore 3.

A stop ring 1a is fitted on the spindle 1 back of sleeve 11 and used as stopper for limiting rearward stroke of the sleeve 11.

An ejector member 17 in the form of a roofed cylinder is disposed for longitudinal movement in the rearmost or bottom portion of the mounting bore 3 of the tubular portion 2. During movement of the ejector member 17, air may flow into and out of the bore 3 through the air port 5 at the rear of the tubular portion 2. A coil spring 19 is mounted between the roof 18 of the ejector member 17 and the bottom of the slot 6 for biasing the member 17 forwardly. The roof 18 of the ejector member 17 has a threaded aperture or hole 20. An annular slot 21 defining a rear engaging step 22 is formed at the forward outer periphery of the ejector member 17.

In FIG. 4, when the balls 10 are receded outwardly and the ejector member 17 has been shifted forwardly within the mounting bore 3, such movement of the ejector member 17 is stopped when the balls 10 are in a position partially projected in the bore 3 and the step 22 is engaged with the radially inner surfaces of the balls 10. In the thus halted position of the ejector member 17, since the coil spring 19 has been extended to its limit length, the ejector member 17 is not capable of forcibly pushing aside the balls 10 and advancing further forwardly.

The tool shaft 23 may be mounted interchangeably in the mounting bore 3 of the tubular portion 2 of the spindle 1. The tool shaft 23 is formed by a shank portion 24 inserted into said bore 3, and a tubular mounting portion 25 integrally formed with the forward end of the shank portion 24.

The base end of the shank portion 24 is formed with a pair of rotation inhibit recesses 26 for engaging with the rotation inhibit projections 8 at the foremost part of the tubular portion 2. When the projections 8 are engaged in the recesses 26, the tool shank 23 is locked in rotation relative to the spindle 1. The leading end of the shank portion 24 of the tool shank 23 is formed with an extracting inhibit peripheral groove 27 formed by an inclined surface 28 to be engaged with said balls 10.

With the radially inner surfaces of balls 10 in a position engaged with inclined surface 28 of the groove 27, it is no longer possible to extract the tool shank 23 out of the spindle 1. The depth of penetration of the balls 10 into the bore 3 may be, but need not necessarily be, greater when the balls 10 are in the position engaging the tool shank 23 than when they are in the position engaging the ejector member 17, as shown in FIGS. 1 and 4.

A collet chuck 29 for holding a drill or tap is mounted to the foremost part of the tool shank 23.

In operation of the change chuck, the movable sleeve 11 is slid forwardly as shown in FIG. 4. The balls 10 may now be receded into the straight portion 15 of the annular groove 14 of the movable sleeve 11. Thus the shank portion 24 of the tool shank 23 is pushed or extruded forwardly by the ejector member 17 as shown by double-dotted chain line in FIG. 4. When extruded in this manner, the shank 23 can be removed from the spindle 1 easily by manual operation. After such removal, the sleeve 11 is returned to its original position by the biasing force of the coil spring 13.

When mounting another tool shank to the spindle 1, with the sleeve 11 slid forwardly, the shank portion of the tool shank is introduced from the front side into the tubular portion 2 of the spindle 1.

The ejector member 17 in the tubular portion 2 is now pressured by the tool shank and pushed towards rear against the resiliency of the coil spring 19. The projections 8 at the foremost part of the tubular portion 2 are engaged with the recesses on the tool shank, at the same time that the extraction inhibit peripheral groove at the leading end of the shank registers with the balls 10 on the tubular portion 2. In this state, the movable sleeve 11 is freed of a forward pressure. The sleeve 11 may thus be moved towards rear and the radially inner surfaces of balls 10 are forced into the mounting bore 3 of the tubular portion 2 by the biasing force exerted by the inclined portion 16 of the annular groove 14. Thus the radially inner surfaces of balls 10 are engaged with the inclined surface of the extraction inhibit groove, thus locking the tool shank to the spindle 1.

In this state, the inner end of the shank portion 24 abuts on the forward end face of the ejector member 17, while the rear end face of the latter abuts on the bottom end of the mounting bore 3.

When the air port 5 of the tubular member 2 is stopped up or dust and dirt have intruded into the space between the inner peripheral surface of the mounting bore 3 and the outer peripheral surface of the ejector member 17 to abstruct smooth movement of the ejector member 17, the latter is taken out of the tubular portion 2 for cleaning its peripheral surface, air port 5 and the mounting bore 3. When removing the ejector member 17, with the tool shank 23 extracted out of the spindle 1, a bar with a threaded end is introduced into the tubular portion 2 so that the threaded end portion is engaged with the threaded hole 20 of the ejector member 17. The latter is then removed out of the tubular portion 2 along with the threaded bar. When removing the ejector member 17, since the step 22 is engaged lightly with the radially inner surfaces thereof balls 10, the member 17 is pulled forcibly for retreating the balls 10 radially or sideways out of the mounting bore 3.

When the member 17 has been extracted from the mounting bore 3, the balls 10 are no longer retained by the member 17, while the sleeve 11 is also no longer retained by the balls 10. Thus the sleeve 11 is slid towards rear under the force of the coil spring 13. This sliding motion is limited by the stop ring 1a mounted back of the movable sleeve 11.

From the foregoing it is seen that the annular groove 21 is provided to the foremost outer periphery of the ejector member 17 and the engaging step 22 is provided to the rear end of the groove 21, so that the forward movement of the ejector member 17 during exchange operation of the tool shank 23 may be braked positively by the radially inner surfaces of balls 10 engaging with the step 22 on the ejector member 17. Hence, any separate regulating device for the ejector member 17 may be dispensed with.

Figure 5:
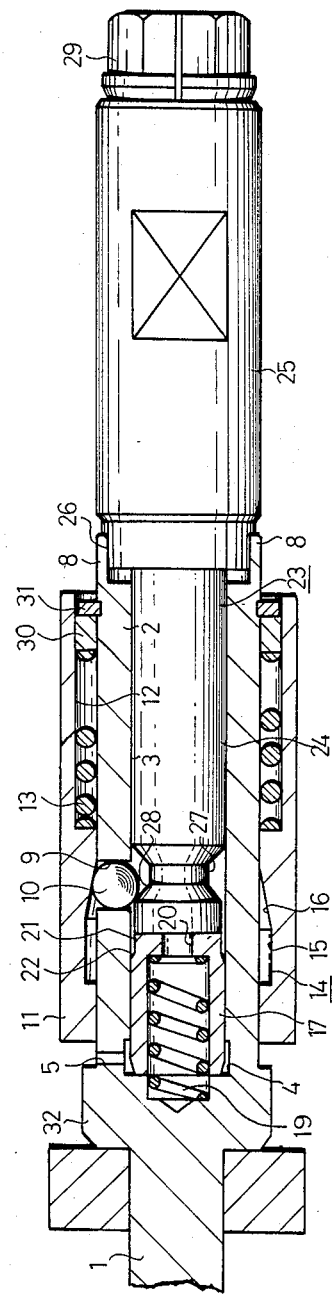
FIGS. 5 and 6 are sectional views showing modified embodiment of the exchange chuck.

FIG. 5 shows a modified embodiment of the exchange chuck according to the present invention. In this modification, an annular spring seat 30 is mounted to the foremost part of the tubular member 2 in place of the enlarged diameter portion 7 of the preceding embodiment. The spring seat 30 is held on the tubular portion 2 by a snap ring 31. In the present modification, an enlarged diameter portion 32 is formed in place of the stop ring 1a provided to the rear end of the tubular portion 2.

Figure 6:
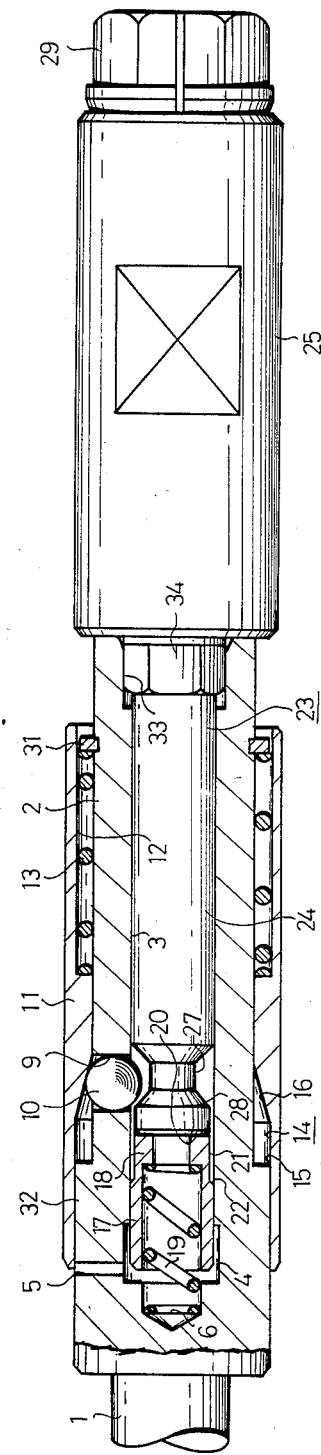

In a further modification of the exchange chuck shown in FIG. 6, a snap ring 31 to be used simultaneously as a spring seat is provided to the forward peripheral surface of the tubular portion 2. The annular groove 14 of the sleeve 11 is extended towards rear to the rear extremity of the sleeve 11. The enlarged diameter portion 32 formed on the spindle 1 is extended forwardly and received in the rear portion of the annular groove 14 of the movable sleeve 11.

In addition, in the present modification, a rotation inhibit hexagonal opening 33 is provided to the forward end of the tubular portion 2 in place of the projections 8 of the tubular portion 2. And in place of the recesses 26 at the base end of the shank portion 24, a rotation inhibit projection 34 in the form of a hexagonal nut is also provided to the base end of the shank portion 24 so as to be received unrotatably within said rotation inhibit hexagonal opening 33. The forward end face of the tubular portion 2 abuts on the rear end face of the mounting portion 25 and the thrust force acting on the shaft 23 towards left in FIG. 6 during punching may be sustained by such abutment. Hence, in the present embodiment, the rear end of the ejector member 17 is not abutted on the bottom end face of the mounting bore 3.

It may be seen that the ejector member operating during exchange operation of the tool shank to extrude the tool shank forwardly may be regulated positively in its forward extruding movement simply by the peripheral groove provided to the ejector member and thus without resorting to any specialized devices.

Since it is evident that broadly different embodiments can be conceived within the spirit and scope of the present invention, it is to be understood that the present invention is not restricted to any specific mode of execution thereof except as defined in the appended claims.

What is claimed is:

1. An exchange chuck for a tool such as a drill, said tool including a tool shank which may be extractably introduced into the chuck and which has a shank portion with first and second ends and an exchange inhibit groove proximate the first end of the shank portion, said chuck comprising;
   a spindle having a tubular portion with a mounting bore in which the shank portion may be introduced;
   a connecting means provided to the second end of said shank portion and said tubular portion and operable upon insertion of said shank portion into said mounting bore to cause rotation of said tool shank in unison with said spindle;
   ejector means in the form of a roofed cylinder received in a bottom end of said mounting bore and being adapted to eject said tool shank, said ejector means having an annular groove formed on the outer peripheral edge of said cylinder and an engaging step formed at one end of said annular groove;
   a coil spring interposed between the roof of said cylinder and the bottom end of said mounting bore for perpetually biasing said ejector means in a first longitudinal direction;
   at least one ball mounted in said tubular portion; and
   a movable sleeve received on said tubular portion for movement longitudinally thereof, said sleeve having an undercut annular groove formed on the inner periphery of said movable sleeve and said undercut annular groove including cam means on one end thereof, said sleeve being adapted through longitudinal movement to cause said ball to be moved radially into said mounting bore between first and second positions, said ball being operative when intruded into said mounting bore in said first position to engage with the extraction inhibit groove of said tool shank to inhibit extraction of said tool shank and operative when intruded into said mounting bore in said second position upon removal of the tool shank to engage said engaging step of said annular groove in said ejector means to inhibit extraction of said ejector means in said first longitudinal direction.

2. The exchange chuck according to claim 1 wherein a second coil spring is mounted between said movable sleeve and said tubular portion for perpetually biasing said movable sleeve in a second direction and wherein said undercut annular groove comprises a straight receding portion designed to allow said balls to be receded radially outwardly away from said mounting bore in the tubular portion and wherein said cam means comprises an inclined portion contiguous to said receding portion and adapted to cause said balls to be intruded into said bore, said inclined portion being progressively reduced in the inner diameter in said first direction.

3. The exchange chuck according to claim 1 wherein said exchange inhibit groove at the first end of the change shaft has an inclined surface for engaging with said balls.

4. The exchange chuck according to claim 1 wherein air port means are provided in said tubular portion at a location proximate to said bottom end of said mounting bore to permit air passage into and out of said mounting bore at the time of forward or receding movement of said ejector means member.

5. The exchange chuck according to claim 1 wherein a female threaded hole is provided to the roof of said cylinder for engagement with a threaded bar.

6. The exchange chuck of claim 1 wherein a stop ring is mounted on said spindle spaced in a second opposite direction from said movable sleeve for limiting receding movement of the movable sleeve.

7. The exchange chuck according to claim 1 wherein said connecting means comprises a pair of rotation inhibit projections formed on a first end of said tubular portion and a pair of rotation inhibit recesses formed at said first end of said shank portion and engaging with said rotation inhibit projections.

8. The exchange chuck according to claim 1 wherein said connecting means comprizes a hexagonal rotation inhibit opening provided on a first end of said tubular portion and a rotation inhibit projection in the form of a hexagonal nut provided on the second end of said shank portion and unrotatably inserted into said rotation inhibit opening.

9. The exchange chuck according to claim 1 wherein the depth of penetration of the ball into the mounting bore in said first position is greater than the depth of penetration of the ball into the mounting bore in said second position.

* * * * *